Jan. 13, 1931.  J. M. CRAWFORD  1,788,861
PEDAL STOP AND YOKE
Filed Jan. 31, 1929
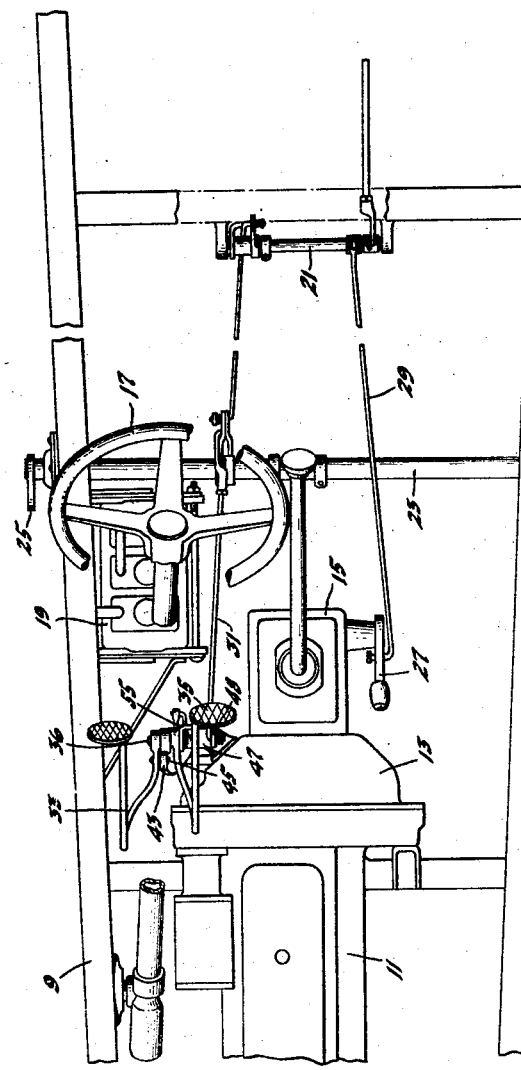
Inventor
James M. Crawford
By Blackmore, Spencer & Hunt
Attorneys Patented Jan. 13, 1931

1,788,861

UNITED STATES PATENT OFFICE

JAMES M. CRAWFORD, OF DETROIT, MICHIGAN, ASSIGNOR TO GENERAL MOTORS CORPORATION OF DETROIT, MICHIGAN, A CORPORATION OF DELAWARE

PEDAL STOP AND YOKE

Application filed January 31, 1929. Serial No. 336,477.

This invention relates to motor vehicles and more particularly to the manually operating means for the brake and clutch.

An object of the invention is to associate with the clutch pedal or brake pedal, or both, a convenient stop to limit the swinging movement of these pedals when released.

Another object is to associate with at least one of said pedals an attachment or yoke designed to so locate the position at which the operative mechanism connected to said pedal is secured as to avoid contact between said connection and other parts of the vehicle.

As a further object the aforesaid stop may be designed to limit the movement of the yoke equipped pedal by engaging the yoke secured thereto.

Other objects and advantages will be understood from the following description.

In the drawing accompanying this description, Fig. 1 is a plan view of a portion of a motor vehicle having the subject matter of this invention associated therewith; Fig. 2 is a view in side elevation; Fig. 3 is a front elevation, this view being at right angles of Fig. 2; Fig. 4 is a perspective of the brake pedal yoke; Fig. 5 is a view in perspective of the stop; Fig. 6 is a top plan view of a similar construction employed in connection with a left hand drive; Fig. 7 is a perspective of the stop as used in the assembly shown by Fig. 6.

Referring by reference characters to the drawing, numeral 9 represents a conventional motor vehicle chassis frame. At 11 is shown a part of the engine, and 13 is the bell housing enclosing the clutch. Numeral 15 represents the transmission housing and 17 the steering wheel. At 19 is illustrated a storage battery which, as is frequently the case, is mounted at the right hand side of the vehicle. Numeral 21 is a rock shaft from which suitable connections extend to the rear wheel brakes. At 23 is a rock shaft provided with terminal arms 25 which are to be connected to the front wheel brakes. An emergency lever 27 is connected by suitable linkage 29 to actuate rock shaft 21. Other connections 31 are used to simultaneously rock shafts 21 and 23 and apply the brakes both front and rear. The connection 31 is to be operated by the conventional brake pedal 33.

The parts described above do not by themselves constitute the invention. The invention resides in the parts associated with the brake pedal 33 and with the clutch pedal 35.

As will be obvious from an inspection of the drawing, Fig. 1 shows a car wherein the clutch pedal and brake pedal are on the right hand side. It will be seen that with such a control the battery, also located on the right hand side will be in the nature of an obstacle in the path of the link from the brake pedal if that linkage extends from the plane of the pedal. To avoid the interference between the battery and the brake link 31, an attachment or yoke is provided for the brake pedal as shown in perspective in Fig. 4. The two pedals 33 and 35 are preferably rotatably mounted on a fixed shaft 36 extending from a boss 38 secured to the bell housing. The attachment or yoke is formed with a boss 41 also rotatably mounted on the shaft 36. This hub or boss is positioned to the left of the levers 33 and 35 and has an arm 43 extending as shown and secured to the brake pedal 35 as by a rivet 45. A second arm 47 extends inwardly and upwardly and is provided with an eye 48 for the attachment of the connecting link 31 by which the rotation of the pedal applied the brakes. The yoke constitutes a very rigid lateral pedal extension particularly owing to its rotatable mounting on the shaft 36. While this attachment is shown on a car with a right-hand drive, it will be understood that a similar attachment might be found desirable on a car employing left-hand drive in case there be obstacles on the chassis on the path of movement on the brake linkage.

Associated with the pedals there is a novel stop shown in detail in Fig. 5 and in its cooperative relation to the pedal attachment in Fig. 2 and Fig. 3. The stop is a simple stamping very economical to manufacturers. It consists of a disc 55 having a central opening 56 to be received upon shaft 36 and a laterally directed arm 57 having a slot 58 to receive a fastening means 59. This fastening means is to be passed through the slot and secured to the bell housing boss. By loosening the fastening means 59 the stamping may in an obvious way be adjusted about the axis of the shaft yoke. It thus serves to limit the swinging of the brake pedal. The stamping has another projecting part 63 with an edge 65 that at times engage the clutch pedal and limit its swinging when released.

It will be seen that in the case of the left-hand drive a similar stamping may be used. In Fig. 7 is shown such a stamping having a central portion 55', a slotted arm 57' and a second abutment portion 63'. In the use of such a stamping for a left-hand drive, it will be of course understood that the boss 38' projects from the left-hand side of the bell housing and is equipped with a shaft 36'. About this shaft the brake lever 33' and the clutch 35' rotate. Since with this construction there is ordinarily no occasion to use an attachment or yoke like that shown in Fig. 4, the central portion of the stamping is placed between the brake pedal and clutch pedal, the arm 57' extending across the plane of the brake pedal and serving to be engaged by the pedal at its edge 61'. The clutch pedal is to engage the edge 65'.

The advantages of the above described expedient will be at once apparent. The stamped stop is very cheap to manufacture and is easily assembled on the same shaft about which the brake and clutch pedals rotate. It is readily adjustable and when adjusted provides simultaneous adjustment for both brake and clutch pedals. In the case of the right-hand drive the stop positioned as shown in Fig. 3 serves to limit the swing of both pedals as it does in the case of the left-hand drive when positioned as shown in Fig. 6.

I claim:

1. In combination, a shaft, a first lever rotatable about the axis of said shaft, a second lever rotatable about the axis of said shaft, a stop having a first part apertured to receive said shaft and having other parts to be engaged by and limit the rotation of said levers, said stop being a stamped plate with the said other parts oppositely distorted from the plane of the first part.

2. The invention set forth in claim 1, one of said other parts formed with a slot and means cooperating therewith whereby said stamped plate may be secured in positions of rotative adjustment.

3. In combination, a shaft, a pivoted lever, a second lever, said levers rotatable about the axis of said shaft, a stop to limit the rotation of said levers, said stop having a first part apertured to receive said shaft, said first part being positioned on said shaft at one side of said levers, a yoke member secured to the remote lever and extending across the adjacent lever, said stop having an abutment portion to be engaged by the adjacent lever and by the yoke carried by the remote lever.

4. The invention defined in claim 3, said yoke comprising a hub also rotatable about said shaft, a first arm secured to the remote lever and a second arm on the opposite side of the hub, the second arm designed for the attachment of an operating connection, the first arm being a part which extends across the adjacent lever and the second arm being the part which engages the stop.

5. A lever stop comprising an apertured stamping having an abutment portion distorted from the plane of said stamping, together with a second portion distorted from the other side of said plane and having a slot therein whereby said plate may be secured in a plurality of positions of rotative adjustment, said second distorted portion also serving as an abutment for a rotating lever.

6. In combination, a shaft, a lever rotatable about the axis of said shaft, a yoke attached to said lever having a hub also rotatable about said axis, an arm extending from one side of said hub for attachment to said lever, an oppositely directed arm for the attachment of operating connections and a stop to be engaged by said second arm.

7. The invention defined by claim 6, said stop having a part rotatable about said axis and means to secure said stop in positions of rotative adjustment.

In testimony whereof I affix my signature.

JAMES M. CRAWFORD.